United States Patent
Sköld et al.

(10) Patent No.: US 6,172,866 B1
(45) Date of Patent: Jan. 9, 2001

(54) TRUCK-MOUNTED BREAKERS INTENDED FOR HIGH-VOLTAGE LINES AND A METHOD IN CONNECTION TO SUCH LINES

(75) Inventors: Leif Sköld, Ludvika; Torbjörn Linder, Saxdalen; Jan Carlsson, Västerås; Carl-Ejnar Sölver, Ludvika, all of (SE)

(73) Assignee: ABB AB, Vasteras (SE)

( * ) Notice: Under 35 U.S.C. 154(b), the term of this patent shall be extended for 0 days.

(21) Appl. No.: 09/147,384

(22) PCT Filed: Jun. 12, 1997

(86) PCT No.: PCT/SE97/01038
§ 371 Date: Mar. 24, 1999
§ 102(e) Date: Mar. 24, 1999

(87) PCT Pub. No.: WO97/48157
PCT Pub. Date: Dec. 18, 1997

(30) Foreign Application Priority Data

Jun. 13, 1996 (SE) .................................................. 9602335

(51) Int. Cl.[7] .................................................. H02B 11/167
(52) U.S. Cl. ........................ 361/606; 200/48 R; 200/50.27
(58) Field of Search ................... 218/106; 361/600–618; 200/50.21–50.27, 48 R–48 V (56) References Cited

U.S. PATENT DOCUMENTS

| | | |
|---|---|---|
| 1,929,293 | 10/1933 | Saint-Germain . |
| 2,128,149 | 8/1938 | Linde . |
| 3,941,659 | * 3/1976 | May et al. ........................ 200/50.23 |
| 3,958,156 | * 5/1976 | Tjebben ................................ 361/607 |

FOREIGN PATENT DOCUMENTS 1 415 613   5/1969   (DE) .

* cited by examiner

*Primary Examiner*—J. R. Scott
(74) *Attorney, Agent, or Firm*—Oblon, Spivak, McClelland, Maier & Neustadt, P.C.

(57) ABSTRACT

A truck mounted breaker for high voltage lines. The breaker is a kind in which a linear displaceable contact device, including a plurality of units, coacts with a stationary countercontact device which includes a corresponding number of countercontact units. The breaker is intended for high voltage lines. All countercontact units are supported by a stand common to the units. The stand also supports the linear displaceable contact device. This arrangement ensures correct alignment of all pairs of contact and countercontact units.

6 Claims, 7 Drawing Sheets

TRUCK-MOUNTED BREAKERS INTENDED FOR HIGH-VOLTAGE LINES AND A METHOD IN CONNECTION TO SUCH LINES

BACKGROUND OF THE INVENTION

1. Field of the Invention

According to a first aspect, the present invention relates to truck-mounted breakers intended for high-voltage lines. According to a second aspect, the invention relates to a method of supporting electrical counterpart contact units in a breaker. By high-voltage line is normally meant a line for voltages above 72.5 Kv, and shall be interpreted as such in this Application.

2. Discussion of the Background

A truck-mounted breaker, so-called truck breakers of the kind with which the invention is concerned, connects and disconnects part of the electric circuit, by moving the electric contact devices carried by the truck breaker into and out of engagement with corresponding, stationarily mounted counterpart contact devices, wherewith the contact devices are preferably moved linearly on a pair of stand-mounted rails. This results in an insulation gap (air gap) on each side of the breaker, which corresponds to opening a disconnector on each side of the breaker. The counterpart contact units of the counterpart contact device are normally mounted in a top and a bottom row, of which the bottom row is normally supported by insulators that are mounted directly on the stand, and which also support the linearly movable contact device, therewith guaranteeing a good fit between the bottom contact units and the counter-contact units. The countercontact units in the upper row are normally held up by insulators depending from a portal. A portal is anchored on a plinth that is separate from a concrete plinth of the stand that supports the linearly displaceable contact device. Consequently, there is a risk that these upper countercontact units will not be retained in a correct position for receiving corresponding electrical contact units on the displaceable contact device. This is because the position of the portal relative to the position of the stand carrying the electrical contact device being disturbed by the thawing of frozen ground, earthquakes or other soil or earth disturbances. Such misalignment may make it impossible to mutually connect the upper contact units with the counter-contact units.

Truck breakers for low and intermediate voltage problems are not confronted with this problem, since in these cases the counter-contacts can be mounted on horizontal beams, one for each vertically distributed group of counter-contact units, as disclosed in DE 1 415 613, for instance. This is made possible by virtue of the short insulation paths that are required in such cases, so as to enable each counter-contact to be attached to the stand with a short insulation element. However, it is not possible to scale-up such a construction for high-voltages, since the pin insulators then become longer and result in an unacceptably high building structure if requisite safety distances are to be maintained.

SUMMARY OF THE INVENTION

Against this background, the present invention endeavours to eliminate the risk of relative misalignment between the upper electrical contact units and electrical counter-contact units respectively.

This object has been achieved in accordance with the invention with a truck breaker intended for high voltage lines including a contact device that is moveable linearly with truck movement and a stationarily mounted counter contact device. and also with a method including the particular step of mounting the counter contact units on upwardly extending insulating pillars that rest on a standpoint located at a level which lies beneath the lowermost counter contact unit.

Because all counter contact units, including the counter contact units in the upper row, are supported in this way by the stand that also carries the linearly movable contact device there is achieved relative positional fixation also with respect to the upper counter contact units, so as to ensure that the positions of the counter contact units in relation to corresponding contact units on the linearly displaceable contact device will be correctly maintained. As a result of the particular arrangement of the supportive devices, this can be achieved with a relatively compact stand.

In a preferred embodiment of the invention, the upper counter contact units are each supported by a respective insulator pillar. According to this preferred embodiment, each upper counter contact unit is supported by an insulator pillar section mounted respectively on top of and underneath the insulator pillar section of the counter contact unit, such that as to constitute an extension thereof. This constitutes a very simple design. In an alternative preferred embodiment, each insulator pillar of the counter contact units is disposed parallel with the insulator pillar of the lower counter contacts and is longer than said counter contacts. This construction reduces the risk of sparking caused by leakage currents.

In still another preferred embodiment, the counter contact units are mounted on high-voltage cable connectors, in which case no additional insulator pillars are required.

The afore-described embodiments and other advantageous embodiments of the invention will be apparent from the dependent claims.

BRIEF DESCRIPTION OF THE DRAWINGS

The invention will now be described in more detail with reference to preferred embodiments thereof and also with reference to the accompanying drawings, in which.

DETAILED DESCRIPTION OF THE PREFERRED EMBODIMENTS

Figure 1:
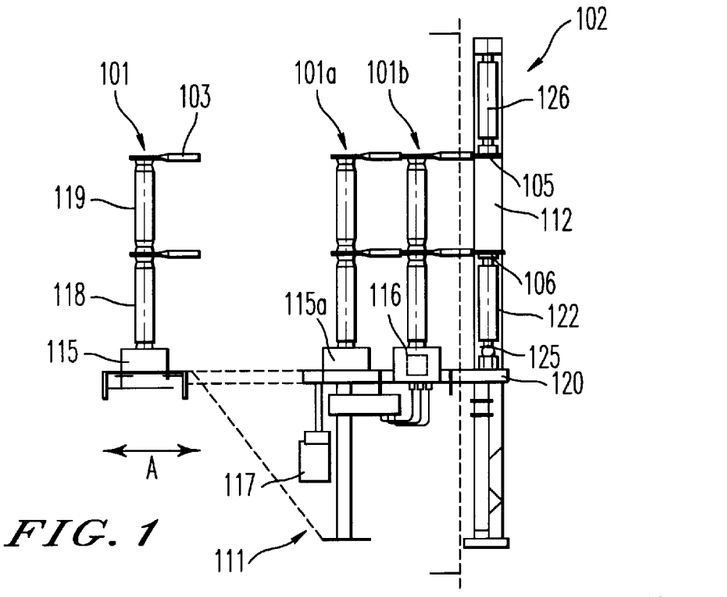
FIGS. 1, 1*a* and 2 are respectively a side view of a conventional truck breaker, an end view of the linearly displaceable electric contact device, and an end view of the electric counter contact device of the truck breaker.
Figure 1A:
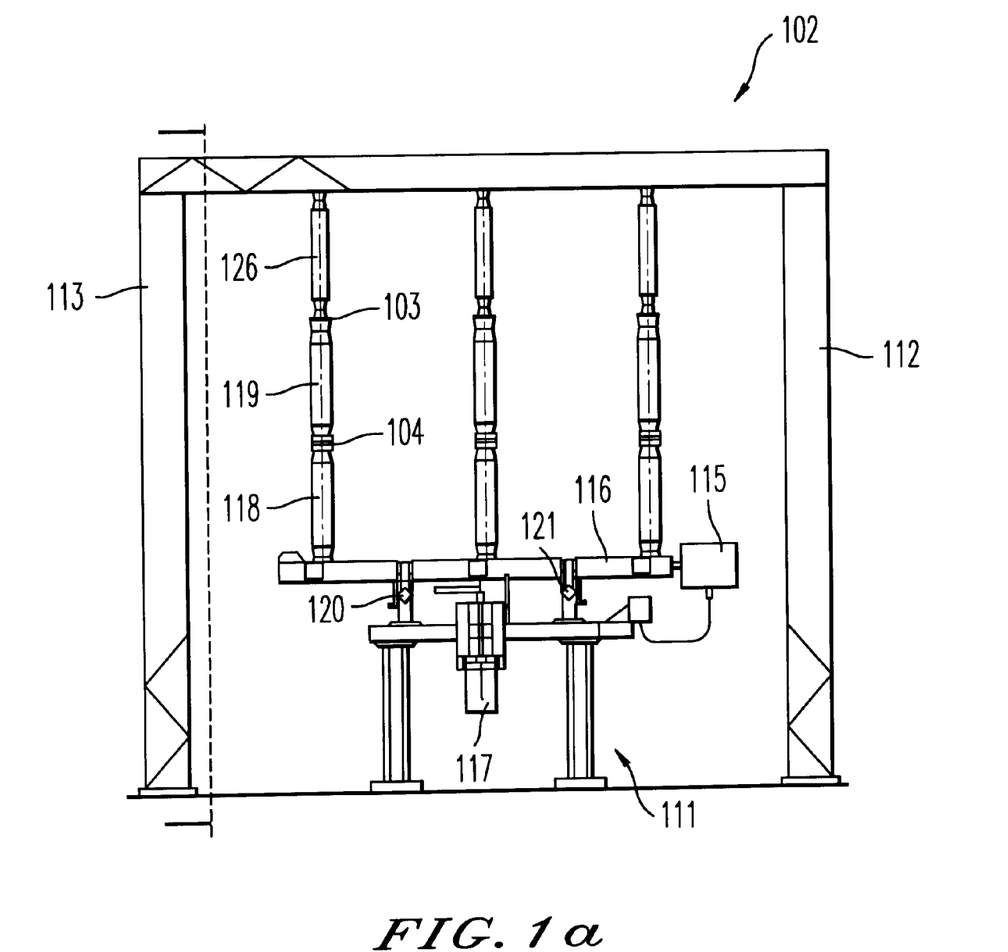
Figure 2:
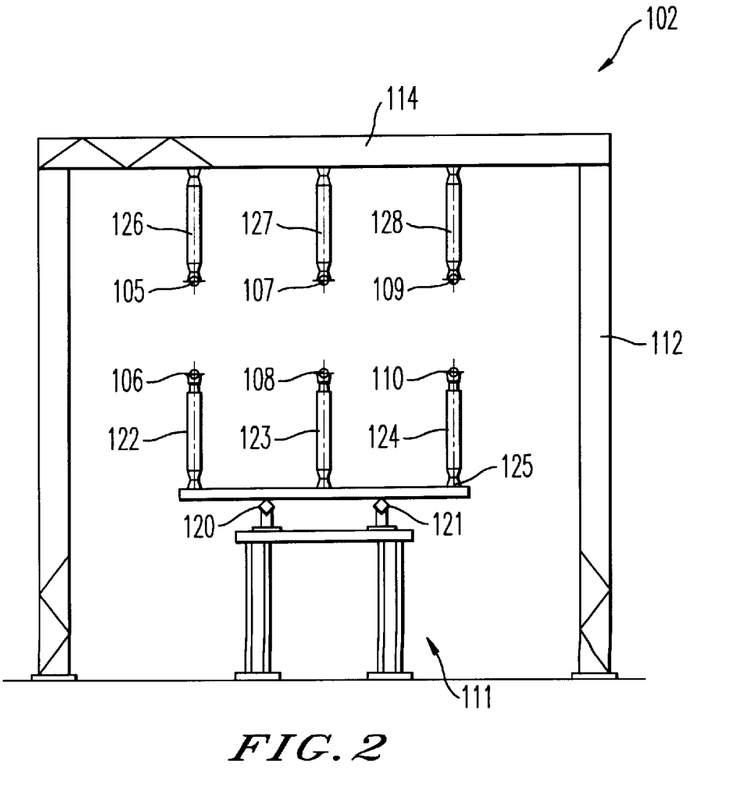

The main components of a conventional truck breaker illustrated in FIGS. 1, 1*a* and 2 consist in an electrical contact device 101 and an electrical counter contact device 102. The contact device 101 includes six contact units, of which only two referenced 103, 104 are visible in FIG. 1. Similarly, the counter contact device includes six counter contact units 105–110 arranged in line with the contact units. The contact units 103, 104 are disposed on a pole bar 116 that can move linearly in the direction of the arrow A. A breaker manoeuvering device 115 is mounted adjacent the pole bar 116. Pole bar movement is manoeuvered by means of a manoeuvering device 117 mounted adjacent a stand 111. The contact device includes three juxtaposed contact pillars. only one of these pillars is visible in FIG. 1. The contact pillar is comprised of a downwardly located pin insulator 118 mounted on the pole bar 116 and carrying an electric contact unit 104 at its upper end. An upwardly located breaker chamber 119 is attached to the upper end of the pin insulator 118 and coaxial therewith. The breaker chamber is comprised of an insulator that includes breaker elements, and the pin insulator 118 engenders sufficient insulation distanced between earth and the contact unit 104. Seated beneath the pin insulator 118 is a mechanism housing, and an insulating manoeuvering rod runs within the pin insulator. The manoeuvering device 115 mounted at one end of the pole bar 116 transfers its movement to all mechanism housings through rotation, wherewith each manoeuvering rod transfers said movement to the breaker. Arranged at the upper end of the breaker chamber 119 is a second electrical contact unit 103. All six contact units lie in the same vertical plane and are moved simultaneously as the pole bar 116 moves. The pole bar 116 is displaced linearly, guided by a pair of rails 120, 121.

The manner in which the six counter contact units 105–110 of the counter contact device are arranged will best be seen from FIG. 2. The lower counter contact units 106, 108, 110 in each pair are each mounted on a respective insulator pillar 122–124, which is mounted on a cross-bar 125 attached to the stand 111, this stand being the same stand that supports the electrical contact device 101. This therewith ensures reliable alignment of the mutual position of the lower contact units 104 with the lower counter contact units. Each of the three upper counter contact units 105, 107, 109 hangs in a respective insulator 126–128 that extends down from an overlying bar 114 of a portal stand that is anchored to the ground with pillars 112, 113. The upper counter contact units 105, 107, 109 are arranged to lie in line with corresponding contact units 103 on the contact device 101. FIG. 1 shows the truck breaker with the contact device in three different positions. Reference numeral 101 denotes the contact device in a position in which it is moved away to a maximum extent, to allow the contact device to be serviced. The reference 101a denotes the contact device in a disconnected, preparatory position, while reference 101b denotes the contact device in a connected position, or state, when all contact units 103, 104 are connected to respective counter contact units 105–110. The drawback described in the introductory part of the Application document of such a truck breaker is because the portal stand, which is not connected to the stand 111 carrying the contact device 101, is liable to be moved positionally relative to the stand 111.

The problem has been eliminated in different ways in the embodiments described hereinafter, a common feature of which is that respective electrical contact devices and counter contact devices are mounted on one and the same stand.

Figure 3:
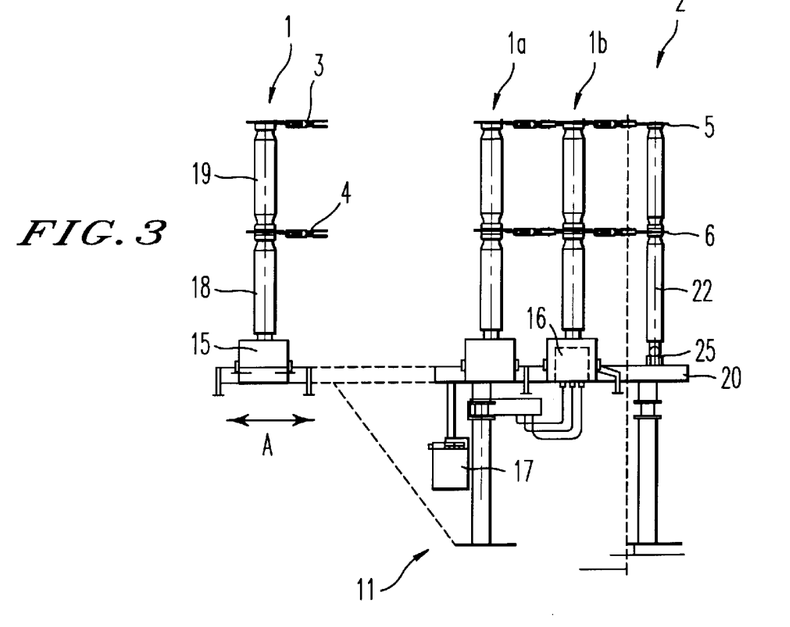
FIGS. 3–5 are respectively a side view of a truck breaker according to a first embodiment of the invention, an end view of the linearly displaceable electrical contact device of the truck breaker, and an end view of the electrical counter contact device of said breaker.
Figure 4:
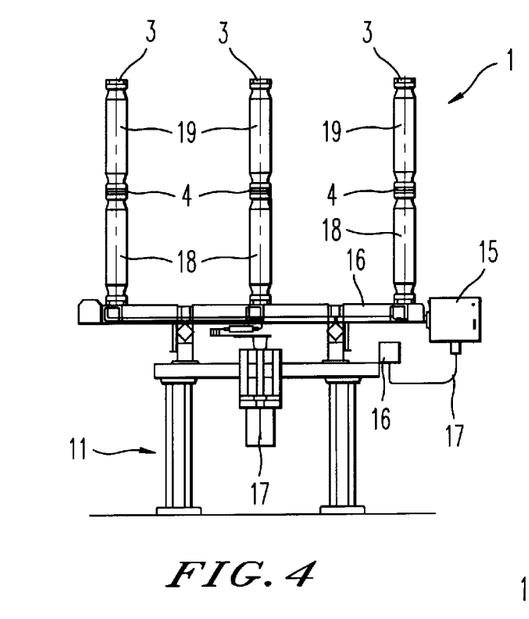
Figure 5:
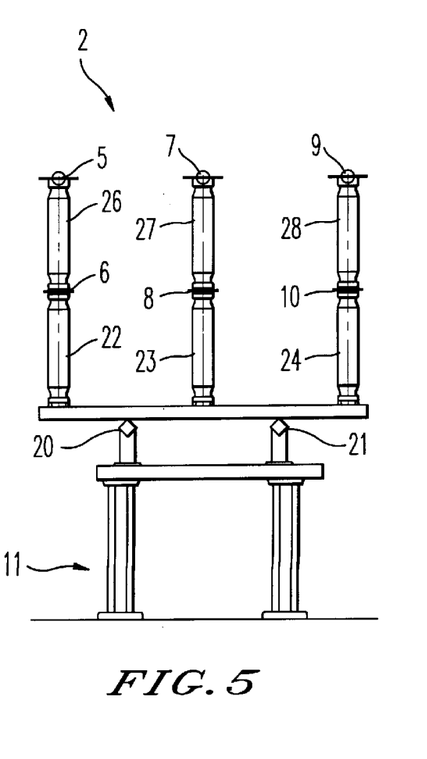

This has been implemented in the embodiment illustrated in FIGS. 3–5, by supporting each of the upper counter contact units 5, 7, 9 of the counter contact device 2 by an insulator pillar 26, 27, 28 which is supported by the respective insulator pillars 22, 23, 24 of corresponding lower counter contact units 6, 8, 10. Because the upper counter contact units 5, 7, 9 are supported by the same stand 11 as that which supports the contact device 1, through the medium of said double insulator columns, correct alignment of their mutual positions is ensured. The truck breaker of the embodiment shown in FIGS. 3–5 is essentially of the same kind as the truck breaker illustrated in FIGS. 1 and 2 in other respects, and the different positions are also designated a and b respectively with respect to disconnected preparatory positions and connected positions. The components 1, 3, 4, 11, 15–21 and 25 in FIGS. 3–5 are, in principle, the same as the components identified with corresponding reference numerals in FIGS. 1, 1a and 2, (although these reference numerals have the prefix 100, i.e. the components are referenced 101, 103 and so on), and consequently reference is made to the description of FIGS. 1, 1a, 2 in this respect. The embodiment hereinafter described also differ from the conventional type of truck breaker mainly by the arrangement of the counter contact device, and consequently other aspects of the truck breaker will not be described in detail here.

Figures 6, 7, 8:
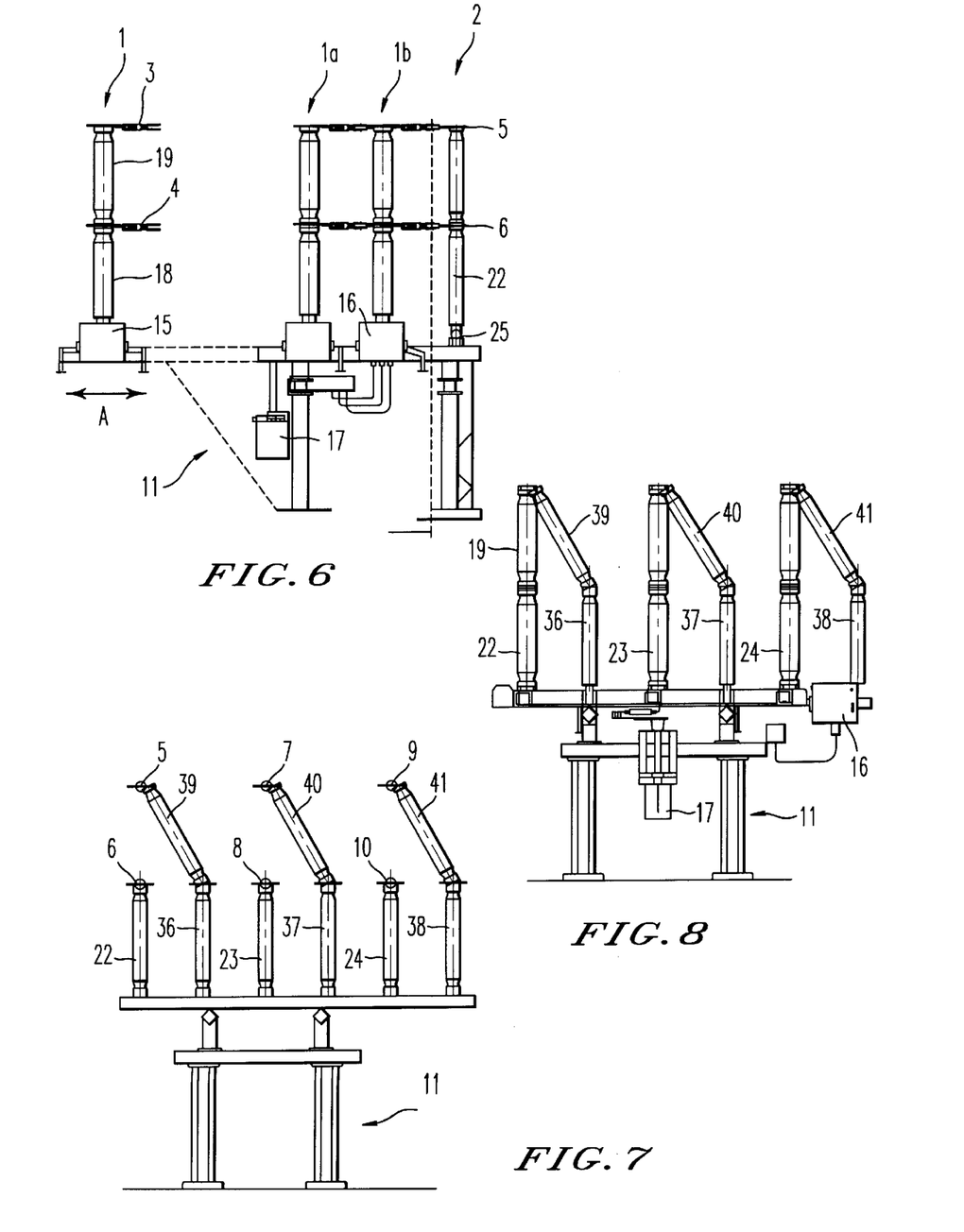
FIGS. 6–8 are views corresponding to the views of FIGS. 3–5 and illustrating a second embodiment of the invention.

In the embodiment illustrated in FIGS. 6–8, the upper counter contact units 5, 7, 9 are mounted on individual insulator pillars 36, 37 and 38. Extending obliquely from the upper ends of respective pillars are insulators 39, 40, 41 which extend obliquely i.e., (sideways=perpendicular to the direction of movement of the truck breaker), such that the respective other ends of said pillars that each carry the upper counter contact units 5, 7, 9 will be located immediately above corresponding counter contact units 6, 8, 10.

Figures 9, 10, 11:
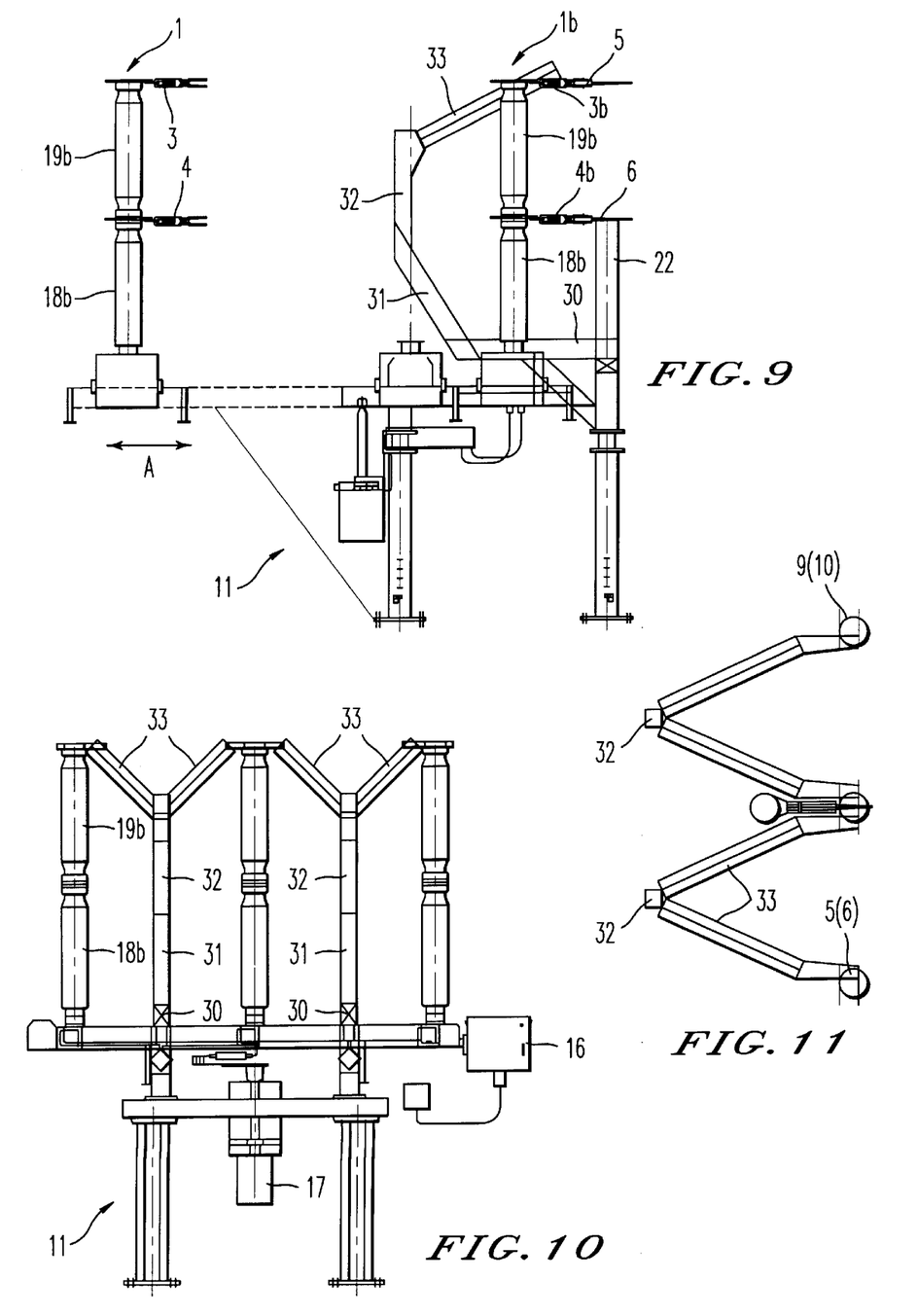
FIGS. 9–11 are respectively a side view of a truck breaker according to a third embodiment of the invention, an end view of said truck breaker, and a view that illustrates part of the truck breaker from above.

In the embodiment shown in FIGS. 9–11, the lower counter contact units 6 of the counter contact device 2 are carried by insulator pillars 22 mounted directly on the common stand 11, similar to the aforedescribed embodiments. A supportive structure in the form of two clamp members attached to the common stand is provided for the upper counter contact units 5. Each clamp member is comprised of a horizontal beam element 30 by means of which it is attached to the stand 11, an obliquely, rearwardly (i.e., opposite to the connecting direction) and upwardly extending beam element 31 attached to the horizontal beam element, and a vertical beam element 32 attached to the beam element 31. Extending from the upper end of the vertical beam element, which as a result of the stand connection has earth potential, there extend two insulators 33 that extend obliquely upwards and obliquely divergent in a V-shape. Respective outer ends of the two insulators 33 each carry an upper counter contact unit 5. Each of these counter contact units is adapted to be located immediately above corresponding lower counter contact units 6.

Figure 12:
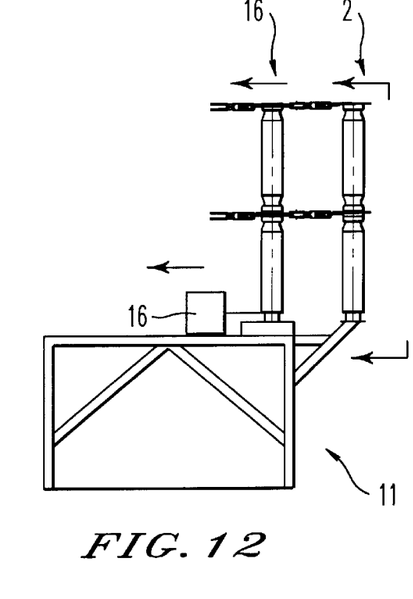
FIGS. 12 and 13 are respectively a side view of a truck breaker according to a third embodiment of the invention and an end view of the electrical counter contact device of said truck breaker.
Figure 13:
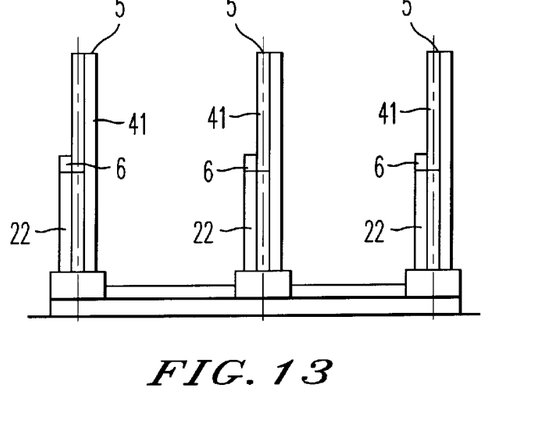

In the embodiment illustrated in FIGS. 12 and 13, each of the upper counter contact units 5 is supported by its respective pin insulator 41 mounted adjacent corresponding pin insulators 22 of the lower counter contact unit 6 and roughly twice as long as said unit.

Figure 14:
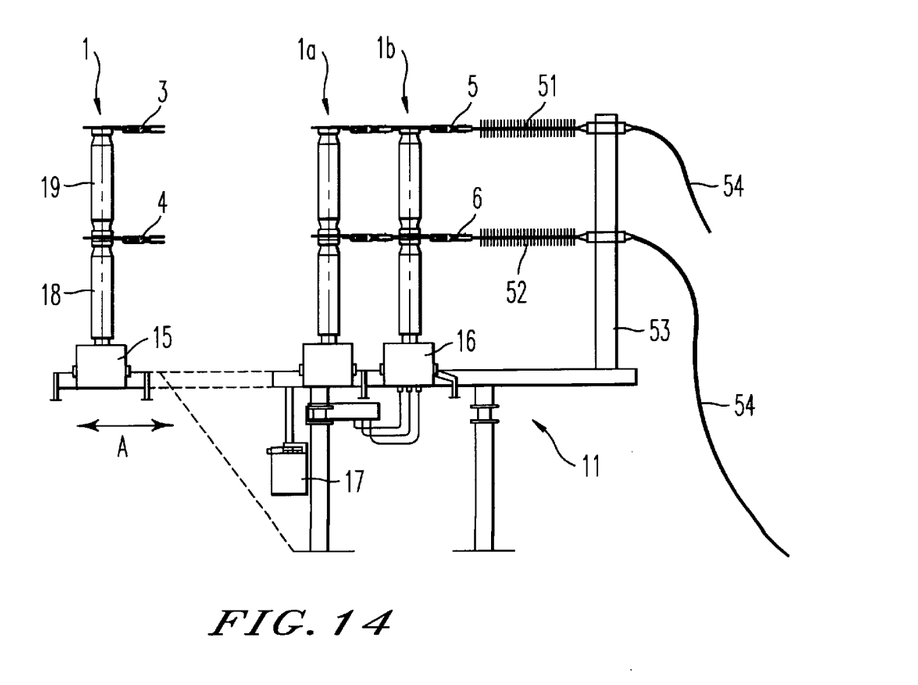
FIGS. 14–16 are respectively side views of a truck breaker according to a fifth, a sixth and a seventh embodiment of the invention.

In the embodiment illustrated in FIG. 14, the upper counter contact units 5 and the lower contact-unit 6 are provided with cable connections 51, 52 carried by an earthed frame 53 attached to the common frame. In this embodiment, the high-voltage lines are high-voltage cables 54 and the illustrated embodiment is particularly suited for such application.

Figure 15:
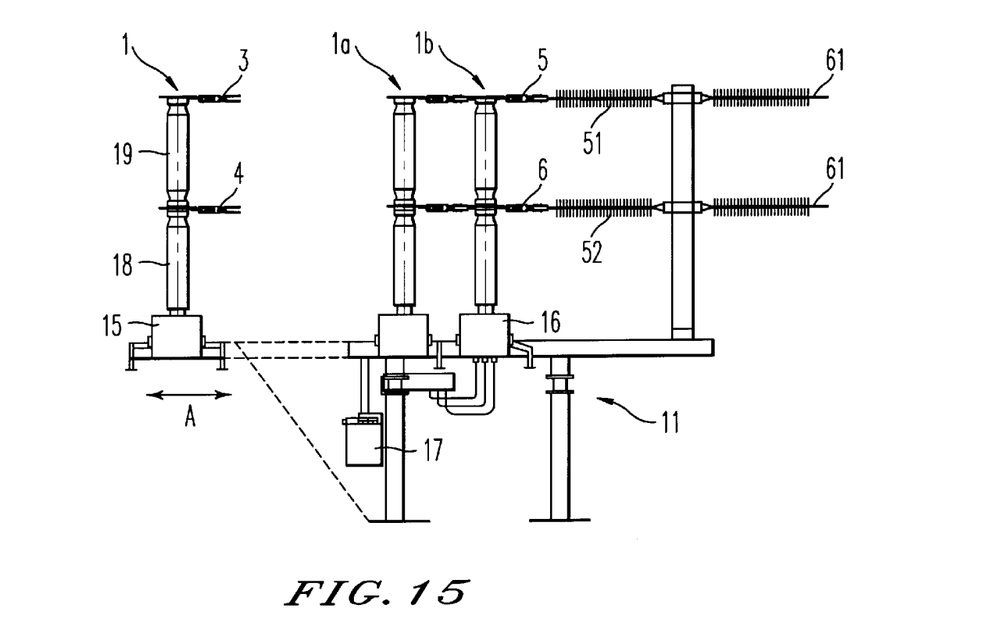

FIG. 15 illustrates a corresponding embodiment of the counter contact devices 5, 6 of the truck breaker intended for overhead lines 61.

Figure 16:
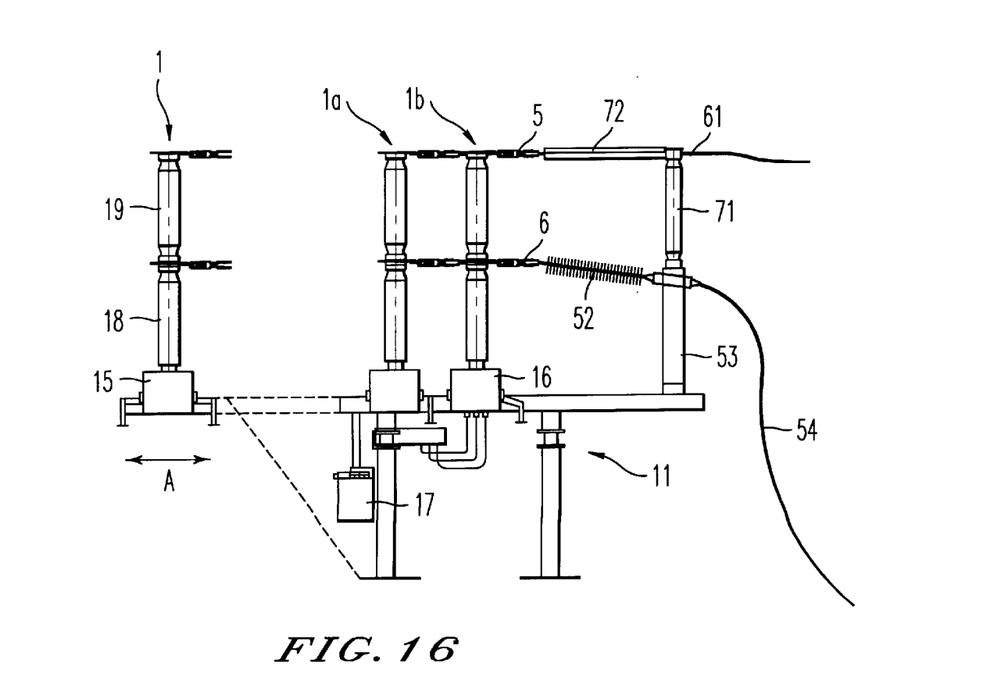

Finally, FIG. 16 illustrates the application of an embodiment in which the lower counter contacts 6 are connected to high-voltage cables 54 and the upper counter contacts connected to overhead lines 61. Each lower counter contact unit 6 includes a cable connection 52 connected to a high-voltage cable 54. The cable connection 52 is anchored to an earthed, vertical stand beam 53 connected to the common stand 11 of the truck breaker. Each upper counter contact unit 5 is connected to an overhead line 61 which extends through a horizontal tube 72 adjacent the counter contact unit. The end of the tube remote from the counter contact unit is attached to the upper end of an insulator pillar 71 mounted on top of a corresponding stand beam 53 of the lower counter contact unit 6.

What is claimed is:

1. A truck-mounted breaker intended for high-voltage lines, comprising:

a contact device configured with a plurality of contact units to move linearly with truck movement; and a stationarily mounted counter contact device including a corresponding number of counter contact units with at least two of said counter contact units disposed at different vertical positions and all counter contact units supported directly by upwardly extending insulator pillars on a common stand, said insulator pillars resting on a stand-part located at a level beneath the undermost of said counter contact units, and said common stand also supporting said linearly displaceable contact device.

2. A breaker according to claim 1, wherein said all counter contact units supported at said different vertical positions lie in a plane that extends perpendicular to the direction of linear movement of the moveable contact device.

3. A breaker according to claim 1, wherein each of said at least two of said counter contact units includes a first counter contact unit carried by a first insulator pillar, and a second counter contact unit carried by a second insulator pillar.

4. A breaker according to claim 3, wherein said second insulator pillar is longer than said first insulator pillar and disposed parallel with said first insulator pillar.

5. A breaker according to claim 2, wherein at least one insulator pillar is divided vertically into two sections, each supporting one of said counter contact units.

6. A breaker according to claim 2, wherein the counter contact units include at least one counter contact unit provided with a cable connection and supported by said insulating pillar that extends up from the common stand.

* * * * *